United States Patent
Brown

(10) Patent No.: US 11,928,945 B2
(45) Date of Patent: Mar. 12, 2024

(54) TECHNIQUES FOR ACTIVE SHOOTER RESPONSE CAPABILITY (ASRC)—COMMUNITY LAW ENFORCEMENT

(71) Applicant: George Bacon Brown, Stafford, VA (US)

(72) Inventor: George Bacon Brown, Stafford, VA (US)

( * ) Notice: Subject to any disclaimer, the term of this patent is extended or adjusted under 35 U.S.C. 154(b) by 0 days.

(21) Appl. No.: 17/715,027

(22) Filed: Apr. 6, 2022

(65) Prior Publication Data

US 2023/0326317 A1 Oct. 12, 2023

Related U.S. Application Data

(60) Provisional application No. 63/171,449, filed on Apr. 6, 2021.

(51) Int. Cl.
*G08B 21/02* (2006.01)
*G02B 27/01* (2006.01)
(Continued)

(52) U.S. Cl.
CPC ......... *G08B 21/02* (2013.01); *G02B 27/0101* (2013.01); *G08B 25/01* (2013.01); *H04N 7/183* (2013.01); *G02B 2027/0141* (2013.01)

(58) Field of Classification Search
CPC .... G08B 21/02; G08B 25/01; G02B 27/0101; G02B 2027/0141; H04N 7/183
See application file for complete search history.

(56) References Cited

U.S. PATENT DOCUMENTS

| 2005/0265256 | A1* | 12/2005 | Delaney | H04L 41/12 |
| | | | | 370/254 |
| 2014/0139681 | A1* | 5/2014 | Jones, Jr. | G08B 27/001 |
| | | | | 348/159 |

(Continued)

*Primary Examiner* — Ryan W Sherwin

(57) ABSTRACT

The Active Shooter Response Capability (ASRC) integrates the ASRC application software, heads-up-display (HUD) smart glasses, ASRC processor/transmitter/controller (PTC) and antennas, with either an existing or ASRC provided CCTV/video surveillance, gunshot detection system (GDS), and loudspeaker (1MC). The PTC provides connectivity for multiple devices to accommodate dedicated processing for multiple response teams. ASRC system enables real-time situation awareness providing first responders the ability to visually locate and track an active shooter while executing a breach entry into the scene. When first responders approach the site of a reported active shooter or gunshot detection system alert of gunshot, the ASRC app is accessed on the squad car onboard computer or optional ASRC tablet which remotely syncs with the facility's PTC. This interaction enables the scroll thru each CCTV/Surveillance camera view to locate and lock-on/auto track the shooters movements. This video is live streamed to the officer worn HUD smart-glasses while executing the enforcement. Additionally, the video is simultaneously live streamed to squad car on-board computer and/or optional ASRC tablet and relayed in real-time to headquarters and or scene command post. The ASRC private sector implementation requires the installation of the ASRC PTC controller and software which is connected to existing CCTV and GDS systems or provided as part of the ASRC capability. For Law Enforcement ASRC implementation is at the squad car level and includes the HUD smart-glasses head gear and the ASRC application software installed on the squad car on-board computer and or optional ASRC ruggedized tablet. ASRC provides real-time response capability and is applicable for all facilities and venues.

2 Claims, 5 Drawing Sheets

(51) Int. Cl.
*G08B 25/01* (2006.01)
*H04N 7/18* (2006.01)

(56) References Cited

U.S. PATENT DOCUMENTS

| | | | | |
|---|---|---|---|---|
| 2015/0070166 A1* | 3/2015 | Boyden | ............... | G08B 25/012 |
| | | | | 340/540 |
| 2015/0124087 A1* | 5/2015 | Jones, Jr. | ............... | G08B 15/02 |
| | | | | 348/143 |
| 2015/0215755 A1* | 7/2015 | Bekanich | ............... | H04W 4/90 |
| | | | | 455/404.1 |
| 2016/0086481 A1* | 3/2016 | McNutt | ............... | G08B 7/06 |
| | | | | 340/540 |
| 2016/0232774 A1* | 8/2016 | Noland | ............... | G08B 25/10 |
| 2017/0124836 A1* | 5/2017 | Chung | ............... | G08B 21/0415 |
| 2018/0122030 A1* | 5/2018 | Raz | ............... | G06Q 50/265 |
| 2018/0315283 A1* | 11/2018 | Brosnan | ............... | G08B 21/02 |
| 2019/0080577 A1* | 3/2019 | Raz | ............... | G01H 3/10 |
| 2019/0122534 A1* | 4/2019 | McNutt | ............... | G08B 7/06 |
| 2019/0295207 A1* | 9/2019 | Day | ............... | G08B 21/02 |
| 2019/0378398 A1* | 12/2019 | Snakenberg | ............... | G08B 25/10 |
| 2020/0226892 A1* | 7/2020 | Coles | ............... | G08B 5/38 |
| 2020/0226913 A1* | 7/2020 | Delgado | ............... | G08B 7/06 |
| 2020/0381006 A1* | 12/2020 | Davis | ............... | G10L 25/24 |
| 2021/0006933 A1* | 1/2021 | Dean | ............... | G16Y 40/10 |
| 2021/0040761 A1* | 2/2021 | de Geus | ............... | E04H 9/10 |
| 2021/0049879 A1* | 2/2021 | Connell | ............... | H04L 9/0894 |
| 2021/0271894 A1* | 9/2021 | Polinski | ............... | B05B 1/02 |
| 2021/0374405 A1* | 12/2021 | Salguero | ............... | G06V 20/10 |
| 2022/0003524 A1* | 1/2022 | Riden | ............... | E06B 9/13 |
| 2022/0019085 A1* | 1/2022 | Osterhout | ............... | G06V 20/36 |
| 2022/0201455 A1* | 6/2022 | Tierney | ............... | H04W 4/029 |
| 2022/0230520 A1* | 7/2022 | Osorio | ............... | G08B 15/00 |
| 2022/0248798 A1* | 8/2022 | Jones | ............... | A42B 3/30 |
| 2023/0048748 A1* | 2/2023 | Fukukawa | ............... | G06F 3/017 |

* cited by examiner

TECHNIQUES FOR ACTIVE SHOOTER RESPONSE CAPABILITY (ASRC)—COMMUNITY LAW ENFORCEMENT

CROSS REFERENCE TO RELATED APPLICATION(S)

This application claims the benefit under 35 U.S.C. § 119(e) of a U.S. Provisional application filed on Apr. 6, 2021 in the U.S. Patent and Trademark Office and assigned Ser. No. 63/171,449, the entire disclosure of which is hereby incorporated by reference.

STATEMENT REGARDING FEDERALLY SPONSORED RESEARCH OR DEVELOPMENT

Not Applicable

REFERENCE TO SEQUENCE LISTING

Not Applicable

BACKGROUND OF THE INVENTION

Field of the Invention

The present disclosure relates to techniques and methods for an Active Shooter Response Capability (ASRC)—Community Law Enforcement, and more particularly implementation of ASRC capabilities at both private sector and public sector venues. Implementation at the private sector enables the passive broadcast of active shooter and other hostile alerts along with law enforcement remote access to real-time display of the venue's surveillance system video and data. Implementation at the public sector includes capability at the squad-car level and other embodiments thereof to receive and optimize the private venue's surveillance system video and data for real-time display and use by law enforcement officer (LEO) or first responder for situational awareness during the approach, entry and maneuvering in a hostile active shooter scene. This capability is especially important for determining in real-time the shooter's/threat location information for safe and effective enforcement.

Description of the Related Art

Many venues employ surveillance systems capabilities and their use in security is becoming more common throughout. However, there is a lack of interface capabilities to enable the real-time sharing of venue's surveillance video and data at the squad-car level for use by first-to-the-scene (FTS) law enforcement during the approach and engagement of an active shooter, hostage, and other threatening of life enforcement situations. Additionally, there is a lack of capability and equipment at the squad-car level to receive, process, and optimize the display of the surveillance system information for tactical use. There is also a lack of personal officer equipment to display the real-time surveillance system information during the approach and engagement of active shooter, hostage, and other life-threatening enforcement situations. Current practices have been for law enforcement first responders to rush into a scene and take control of the situation. This has proven to be a deadly procedure that has resulted in serious injury and death for both LEOs and the innocent public. Accordingly, there could be meaningful safety benefits from a capability that enables the passive broadcast of emergency alerts and the ability to remotely access real-time surveillance system video and data that can be received by any equipped squad-car in the vicinity. Additionally, implementing equipment at the squad car level for an onboard ability to receive, process, and optimize the real-time surveillance system video and data for real-time display and use. As well as include individual officer tactical heads-up display capability that is wearable, integrated into a ballistic helmet, and handheld embodiments of display devices that can be used during a tactical entry and use on the scene.

The above information is presented as background information only to assist with an understanding of the present disclosure. No determination has been made, and no assertion is made, as to whether any of the above might be applicable as prior art with regard to the present disclosure.

SUMMARY OF THE INVENTION

Aspects of the present disclosure are to address at least the above-mentioned problems and/or disadvantages and to provide at least the advantages described below. Accordingly, an aspect of the present disclosure is to provide the Active Shooter Response Capability (ASRC)—Community Law Enforcement, primarily for law enforcement and security use. The ASRC focus is on private/public sector cooperation in community law enforcement with capability implementations at both the private sector/venue level and the public sector/squad-car/LEOs levels. ASRC enables law enforcement with a real-time on-scene maneuver visibility for first-to-scene (FTS) responders during active shooter, hostages, and life threating situations.

Implementation of ASRC at the private sector venue level enables a real-time automated emergency distress notification and remote access by law enforcement of the venue's surveillance system to gain scene real-time situational awareness. This requires installation and integration of the ASRC processor/transmitter/controller (PTC) for interface with the venue's existing or ASRC specified surveillance system. The ASRC-PTC (PTC) can interface with a multitude of surveillance systems technologies such as analog, digital, internet protocol (IP) networks, and wired and wireless configurations. However, for maximum compatibility and functionality a venue's surveillance system must be Open Network Video Interface Forum (ONVIF) compatible and include an integrated gunshot detector capability (GDC) and intercom/loudspeaker (1MC). Otherwise, a ASRC specified internet protocol (IP) surveillance system with integrated GDC and 1MC broadcast should be implemented at the venue's facility to satisfy ASRC requirements. A primary function of the PTC is to initiate the broadcast of emergency threat alert/alarm initiated by the venue's surveillance system. Emergency threat alert/alarm occur whenever a gunshot is detected by a system gunshot detector sensor or manually initiated by someone at the venue because of an active shooter, hostage, or life-threatening event. Whenever there is an emergency threat alert/alarm, the PTC generates a signal that is broadcast/transmitted via the PTC antennas. This signal can be received by any ASRC equipped squad-car(s) on-board computer (SOC) and or the optional ASRC tablet (AST) that is within one-half mile vicinity of the transmitting PTC. The installation of each PTC in a facility or venue is documented and added to the ASRC Community Law Enforcement Database (ACD) for the associated law enforcement area of jurisdiction. All PTCs incorporate a unique identifier and GPS receiver and has three integrated functional sections. The PTC processor section that performs system data processing and computing functions. The transceiver section with dual radio IEEE 802.11a/b/g/n/ac/ wireless access point/client/bridge/repeater/router functionality. The systems controller section performs management functions associated with accessing and processing the venue's surveillance system network camera communications and data. Tasks that involve all PTC functional sections is executing control instructions from the ASRC Application (APP) to optimize scene video and data that will be live streamed in real-time for display and tactical use. The control function instructions or inputs for optimizing the scene video and data are 1.) scroll/search of camera views for target(s) identification and designation, 2.) initiate lock-on and track functionality of designated target(s), and 3.) display optimized scene video of designated target(s) movements. Target(s) is used herein to represent the active shooter, suspect, or threat. Optimizing the scene video formats the display for tactical use such as setting the camera views to display the target movements superimposed on a simulated floor plan map. A primary feature of the optimized view is display of target location and indicate the target's relative position to the ASRC heads-up display (HUD) device worn by the first responder LEO entering the scene. To accommodate the functions associated with optimizing the scene video, the surveillance cameras and integrated GDCs and 1MCs are configured in a grid network schema. This arrangement considers camera position and camera field-of-view to provide full coverage of the private sector venue. Venue full coverage must include visibility of each floor level of a facility, entry and exit doorways, foyer, stairwells, hallways, rooms (except lavatories), recess area, bays, alcoves, and the facility grounds and parking lots.

Implementation of ASRC at the public sector includes installation of the ASRC application on the SOC and the optional AST, as well as outfitting LEOs with a ballistic helmet and HUD device with microphone set. The microphone set is integrated with the HUD device and when activated broadcasts LEO scene instructions/commands over the facility's 1MC during the enforcement. At the squad-car level, the APP enables reception of PTC broadcast/transmissions of emergency distress alert/alarm signals and provide a channel for remote access/connection to the transmitting PTC. After installation of the APP, the device(s) will automatically access to the ASRC Community Law Enforcement Database (ACD). The ACD database provides identifying information for all PTC installations within a law enforcement area of jurisdiction. Operation of the APP is intuitive however operator/user and refresher training will be necessary to ensure user knowledge and efficiency using the ASRC capability. Upon the PTC transmission of an emergency distress alert/alarm, the display screens of SOC and AST will begin flashing with an accompanying beeping tone. This notification instructs the LEO/user to press/tap/click the APP icon to open the ASRC control panel. Dependent upon whether the alert was initiated by the GDC or manually activated at the scene facility will determine the information provided in the control panel display. For alerts initiated by the GDC, the control panel will display the camera view in the location of the gunshot detector superimposed over simulated floor plan map. The LEO/user will use the SOC touchpad/trackpad or the optional AST stylus to scroll through camera views using camera zoom as necessary to confirm the target attributes. Once the target is located, the LEO/user will place the screen cursor on the target and click/tap to enable target lock-on and track. Additionally, once the screen cursor is positioned over the target you can click/tap the Lock/Track display icon to initiate tracking of the target movements. For alerts manually initiated at the scene facility, the control panel will display the first/ground level floor camera view superimposed on the simulated floor plan map. The LEO/user will use the SOC touchpad/trackpad or the optional AST stylus to scroll through each floor level camera views to locate the target. Once target is located, place the screen cursor on the target and click/tap the cursor to lock-on and track the target, You can also press/tab on the Lock/Track display icon to initiate tracking of the target's movement. At the point that target lock/track is acquired the display will follow the target movements and display the relative position of the LEO worn HUD device from the target. Additionally, the simulated floorplan map will display a graphical display of the target location in the facility. If the target enters a room where there is no internal camera grid coverage available (i.e., rest room, closet, etc.) the display will stay at that position until the target either reappears by exiting that room thus reinitiating the tracking or law enforcement ascends to the position to neutralize the threat.

The ASRC processes and applied technologies introduces a comprehensive solution that enhances community law enforcement capability. A significant technology and tool that is integrated into ASRC processes and methods is the portable and personalized see through heads-up-display projection capability (HUD). The HUD device is worn by LEOs and has electronics enabling it to transmit and receive data/information and display live-stream video. Specifications for ASRC HUD devices is minimum android 11 operating system (OS) and H.265 High Efficiency Video Coding HEVC protocol or comparable capability. The APP is also installed on the HUD device and capable of the features described for both SOC and AST. However due to size constraints and ease of use, the primary function of the HUD is to provide a see-through projected/display of target movements superimposed on a simulated floor plan map for tactical use during enforcement activity. The HUD receives the identical optimized video and data as the SOC and AST that is live streamed from the PTC. One embodiment of the HUD is it fully integrated into a Ballistic Helmet and another embodiment is the HUD smart glasses worn under the Ballistic Helmet. Each embodiment may integrate a microphone set that is used to initiate 1MC broadcast of LEO instructions to the scene.

The ASRC capability requires specific equipment performance standards and protocols to achieve desired innovations and or required performance, reliability, and durability for use in a law enforcement environment. To achieve the ASRC systems surveillance features and capabilities there is a minimum performance requirement specified for existing surveillance camera system and technologies to interface with PTC, HUD, AST and APP capabilities. When existing surveillance system capabilities are unsatisfactory a specified surveillance system that consists of an integrated IP surveillance camera network (IPSN), gunshot detector capability (GDC), and broadcast-intercom/loudspeaker or 1MC will need to be implemented. Other embodiments of the ASRC components and capability includes the implementation of comparable components, chipsets, and configurations to satisfy special department of commerce (US DOC) standards for law enforcement equipment and taking advantage of the federal communications commission (FCC) public safety frequency spectrum.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompany drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
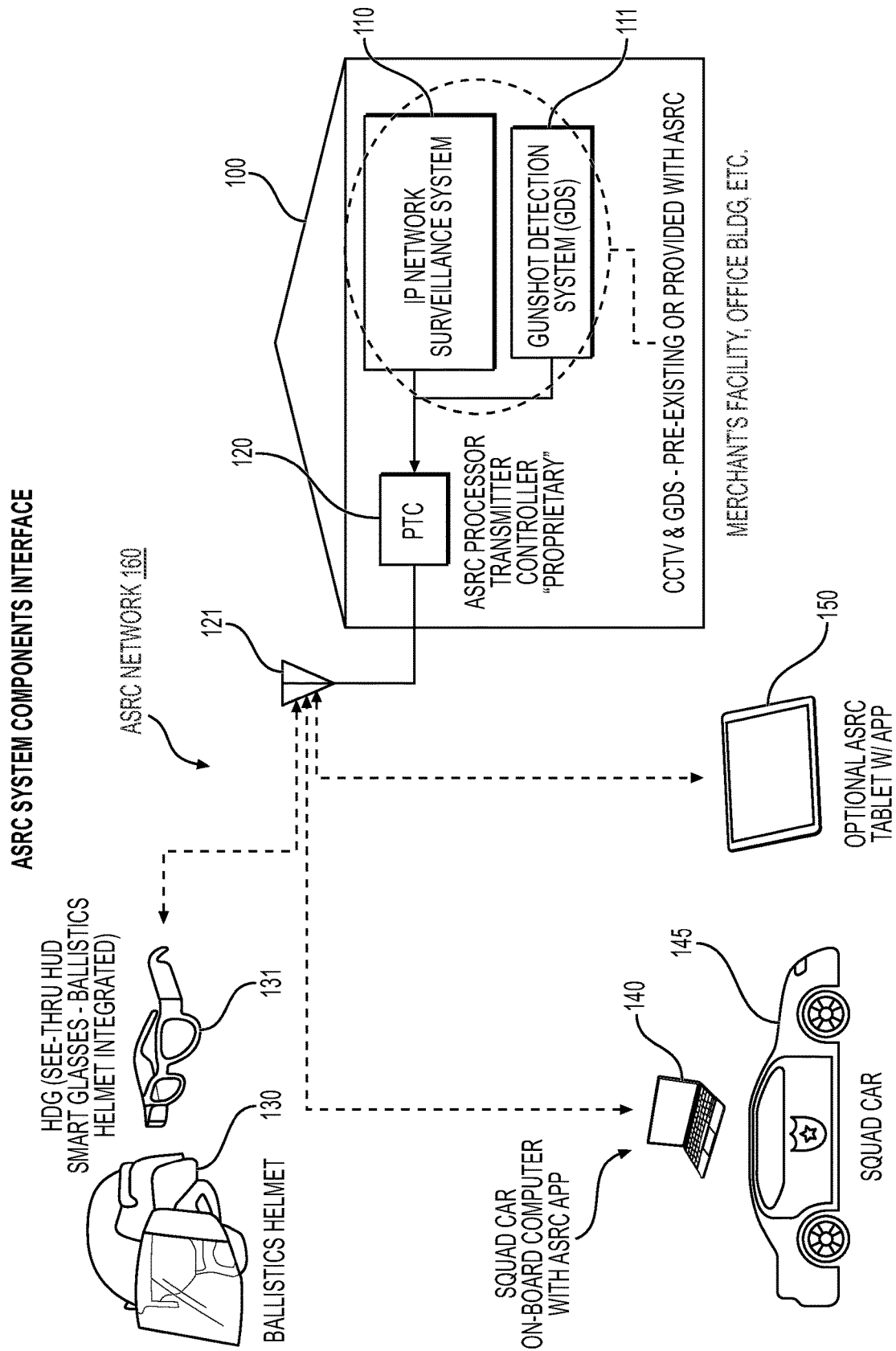
FIG. 1 shows a system diagram that illustrates the ASRC system components and wireless network interfaces in an operational environment.
Figure 5:
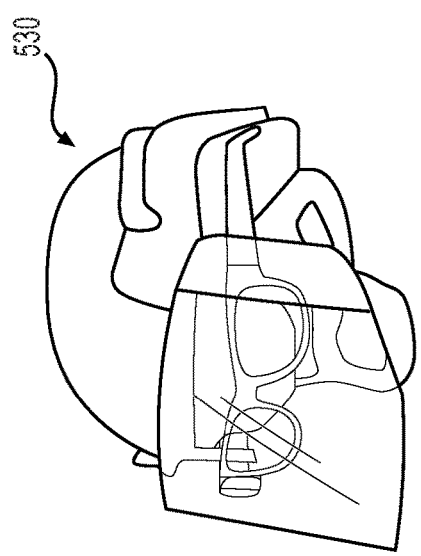
FIG. 5 shows a perspective view of an embodiment of the HDG with the HUD smart glasses worn under the ballistic helmet and integrated microphone set (not illustrated)
Figure 6:
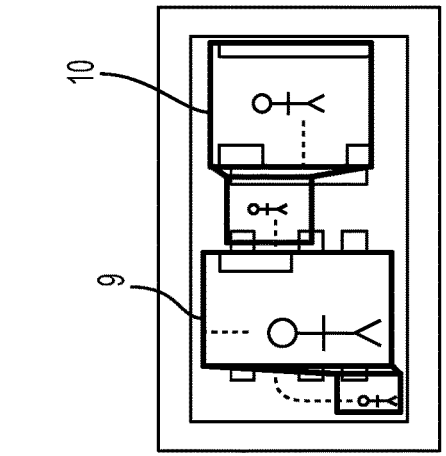
FIG. 6 shows a perspective view of an embodiment of the HDG with the HUD display integrated into the ballistic helmet and integrated microphone set (not illustrated)

When you consider the responsibility of policing urban, suburban, and even rural areas each squad car on patrol can become a first-to-scene (FTS) for a multitude of situations. Despite our best efforts there are more frequent and unpredictable occurrences involving interior under roof venues (e.g., schoolhouse, big box stores, shopping malls, industrial plants, office building, hospitality, medical, military complexes, etc.) instances of active shooter, hostages, and life-threatening events happening almost daily. Without the ability to achieve real-time eyes on threat/target position information, it is unlikely that current law enforcement scene ingress procedures can be accomplished without a high risk of LEO injury or death during enforcement activities. The ASRC—Community Law Enforcement capability provides a process and toolkit for law enforcement and security use only, that is implemented at both the private venue and squad-car level. It enables a real-time FTS capability to achieve advance situational awareness and eyes on threat visibility during entry and maneuver in the scene to quickly neutralize the threat. This is facilitated by a private/public cooperation in community law enforce. The private sector venue level 100 is satisfied with implementation of the ASRC PTC 120, PTC antenna set 121 and interfaced with the IPSS/1MC 110 and GDC 111. The public sector squad-car level 145 is satisfied with the installation of the ASRC App 140 on the squad-car on-board computer (SOC), implementation of the ASRC Tablet w/App (AST) 150 and the jurisdictional ASRC community law enforcement database (ACD) 142 and outfitting the LEOs with the heads-up-display (HUD) smart glasses 131 and ballistic helmet 130 (HDG). There are multiple ways of providing LEOs continuous scene pursuit visibility and display of real-time camera view tracking live streaming of a designated active shooter/threat. FIG. 5 show one embodiment 530 of the HUD smart glasses 131 with integrated microphone set (not illustrated) worn under ballistic helmet 130. FIG. 6 show another embodiment 630 HUD display and microphone set (not illustrated) fully integrated into ballistic helmet 130. FIG. 1 shows another embodiment 150 is hand carried or suspended with a lanyard for viewing as necessary while wearing ballistic helmet 130. Wireless video and data communications between the private and public sector are transmitted via the encrypted wireless network 160 using WiFi Alliance's Wi-Fi Protected Access 3 Advanced Encryption Standard (WPA3-AES) protection mechanisms. ASRC system components are durable and require an Ingress Protection (IP) rating of IP54 or greater to provide a substantially reliable degree of operation during inclement weather conditions. Another use embodiment of the ASRC capability is the use by private security firms to provide active 24/7/365 commercial and private property/facilities security patrols.

Figure 4A:
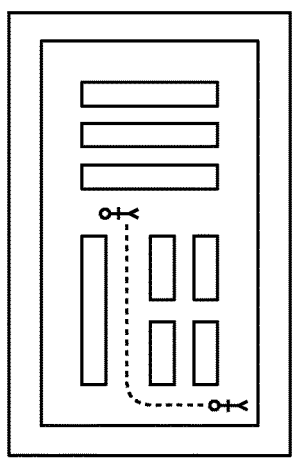
FIG. 4A shows a screen view of the flashing display screen and beeping tone notification being received by an ASRC equipped squad-car on-board computer (SOC) and ASRC Tablet (AST) once an emergency distress alert/alarm has been transmitted from a facility or venue PTC device.
Figure 4B:
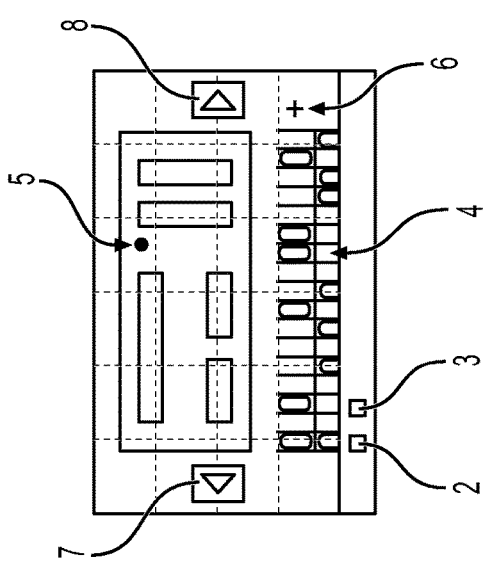
FIG. 4B shows a screen view of the ASRC App control panel features that is displayed after the LEO/user click/press/taps the ASRC App icon on the flashing display screen notification of an alert event.

There is shown in FIG. 1 a pictorial of the private/public system cooperation diagram of private sector process 100 and public sector process 145 that illustrates the overall operational system network and components interface. In this embodiment is an operational scenario of an emergency distress alert/alarm triggered by a detection of several gunshots fired by active shooter illustrating the full functional process flow for process 100 and process 145 response capability. Whereas the GDC 111 sends a signal to PTC 120 to initiate the ASRC wireless network 160 and transmit via PTC antenna set 121 an emergency distress alert/alarm over the ASRC wireless network 160. Any ASRC equipped squad-car 145 within one-half mile vicinity of the PTC 120 will instantly receive a flashing display screen and beeping tone notification FIG. 4A on the SOC 140 and AST 150. Upon notice of flashing display screen and beeping tone notification the LEO/user will press/click/tap the ASRC App (APP) icon FIG. 4A position 1 on the SOC 140 and AST 150 to access the APP control panel FIG. 4B. Immediately after accessing the APP control panel FIG. 4B engage the APP's GPS by pressing down on the GPS enable/disable and display zoom control icon position 2 until the icon begin to flash/blink. This inserts an on-screen display box that automatic displays direction to the transmitting PTC. The icon will continue to flash/blink while GPS is in use. To disengaged press and holding until the icon stops flashing. The APP control panel FIG. 4B provides the interface and features necessary to set up the camera view video optimization. Because the emergency notification was initiated by the GDC 111 the APP control panel FIG. 4B displays the simulated floor plan map of the floor where the detecting gunshot detector sensor is located and the sensor position on the floor plan map is highlighted as position 5 in FIG. 4B. The other and normal control panel display features presented in the APP control panel FIG. 4B are the GPS enable/disable and display zoom control icon position 2, target designate/lock-on/track icon position 3, the superimposed simulated display of the facility parking lot/grounds camera grid coverage position 4, the multi-function control panel display cursor position 6, the display scroll left icon position 7, and the display scroll right icon position 8. Camera view video optimization is done by using the features of the control panel display FIG. 4B to scroll, by pressing scroll icons position 7 and 8, through the surveillance system camera view grid coverage, and using zoom icon position 2, by positioning finger/stylus/cursor at top of icon and press and drag downward to zoom out and the reverse to zoom in, as necessary to assist in locating and identifying an active shooter/threat suspect/target. Once target is located, initiate target designate/lock-on/track by placing the display cursor position 6, on the active shooter/threat suspect/target and click/press/tap the cursor. Alternative method to initiate target designate/lock-on/track is to place the display cursor position 6, on the active shooter/threat suspect/target and click/press/tap the target designate/lock-on/track icon position 3. This completes the camera view video optimization and automatically activates the live streaming of real-time optimized scene video from the IPSS 110 via the PTC 120, PTC Antenna set 121, ASRC Network 160 to SOC 140, AST 150, and HUD device 131 and embodiment thereof. Next step is for the LEO/user is to prepare the HDG 131 and 130 for use and turn on the HUD device 131 by viewing the right side of the HUD device 131 and press and hold the third and rear button for three seconds to power up the device. Once the HDG 131 and 130 prep for use is complete the LEO will proceed to the scene using the GPS direction provided in the on-screen display box that is displayed on SOC 140, AST 150, and HUD device 131.

Figure 2:
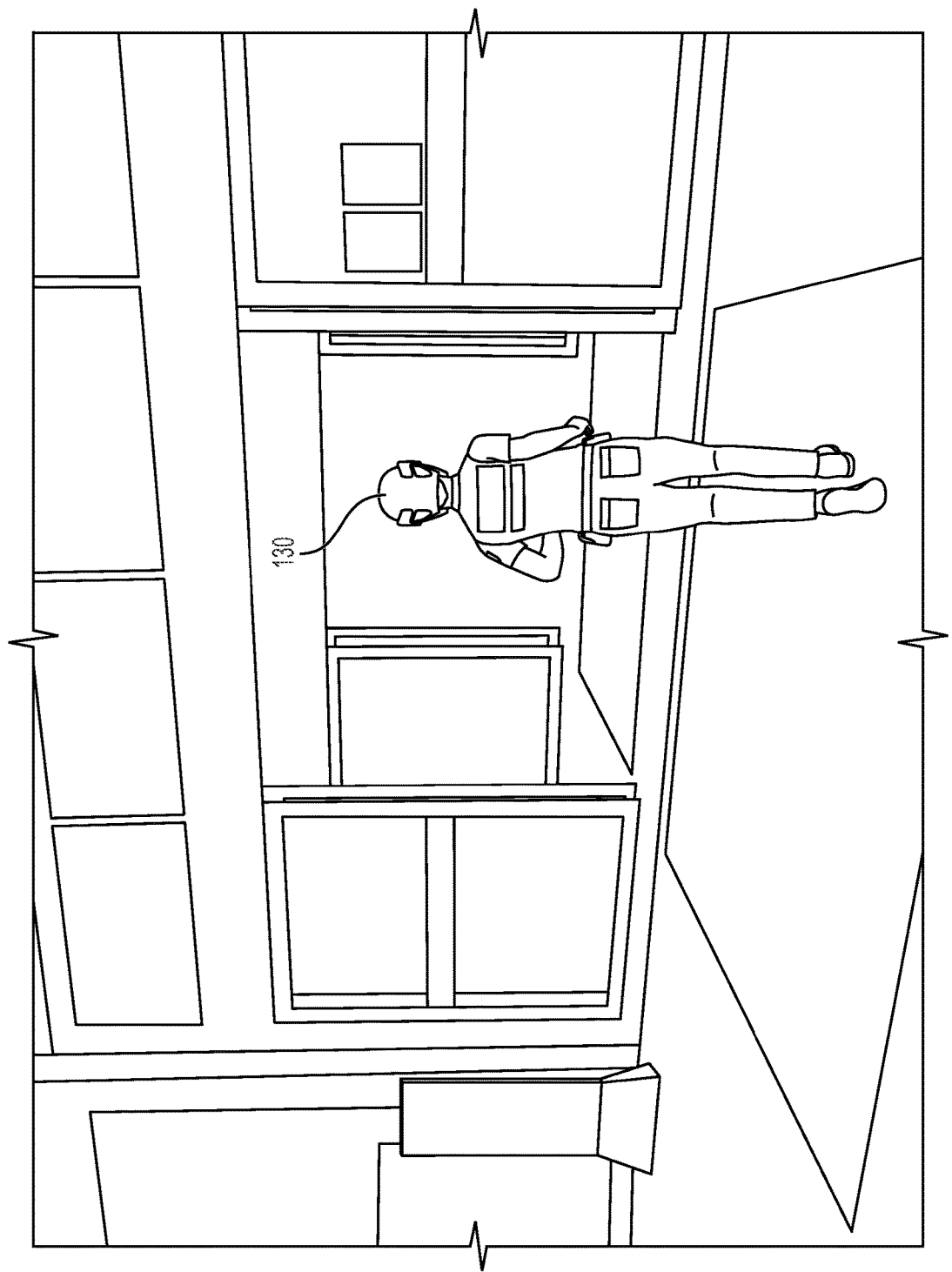
FIG. 2 shows a perspective view of the first-to-scene LEO wearing ASRC HUD Display Gear and ballistic helmet (HDG) headgear embodiments in the operational environment performing its functional requirements of displaying optimized surveillance video that provide scene visibility and orientation to guide venue entry and maneuver during an active shooter, hostage, or life-threatening situation.
Figure 4D:
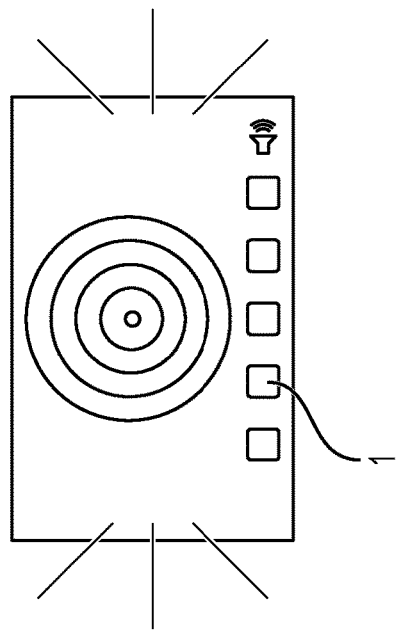
FIG. 4D shows a screen display of the real-time camera views tracking the target's movements throughout the camera grid coverage to indicate the relative position of target from the LEO worn HDG.
Figure 4C:
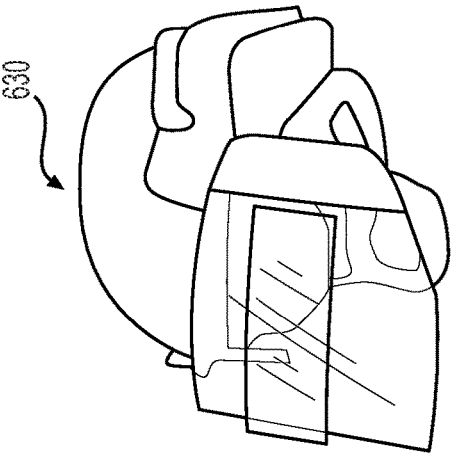
FIG. 4C shows a screen view illustrating the targets incremental change in position movement superimposed over the simulated floor plan map. This is an optimized display that is available when the initial distress alert was triggered by the GDC/GDS (GDC and GDS refers to the same capability) and appears temporarily on all displays when a new shot is detected after the activation of target designation, lock-on/track feature. The display remains for approximately three seconds before returning to the camera view displaying the tracking of target's movements as illustrated below in FIG. 4D.

As shown in FIG. 2 is a pictorial of a LEO in the process of a tactical entry into the scene outfitted with the HDG 131 and 130 personalized ASRC headgear. Upon arrival on scene the LEO may have had a moment to disengage the GPS display before beginning the entry. The LEO is now in the scene and will take advantage of the scene visibility with real-time live streaming optimized video displayed on the HUD device 131. This will enable an enhance ability to maneuver in the scene to quickly neutralize the situation. In this scenario, the emergency distress alert/alarm was initiated by a signal from the private sector GDC 111, and video optimization is activated. Should the active shooter/threat suspect/target fire another shot the display will change temporarily displaying the targets incremental change in position movement superimposed over the simulated floor plan map FIG. 4C and then returning to the optimized display FIG. 4D.

Figure 3:
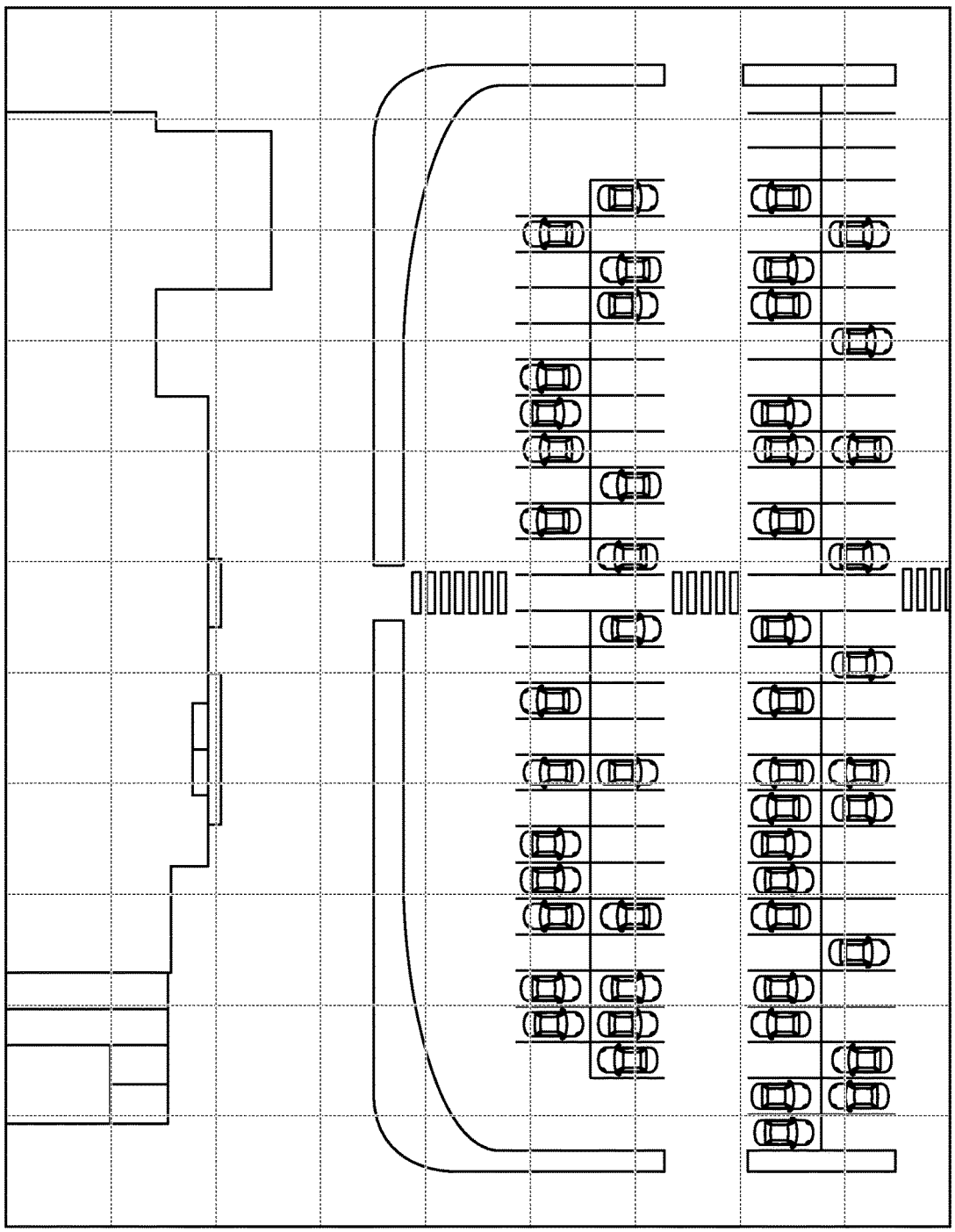
FIG. 3 shows a top view of the typical ASRC surveillance system camera grid coverage.

There is shown in FIG. 3 a pictorial illustrating a typical surveillance system camera coverage grid and through the application of networked sensors methodologies, algorithms and advanced computing strategies enabled exploitation of both internal and external areas of coverage.

Figure 7:
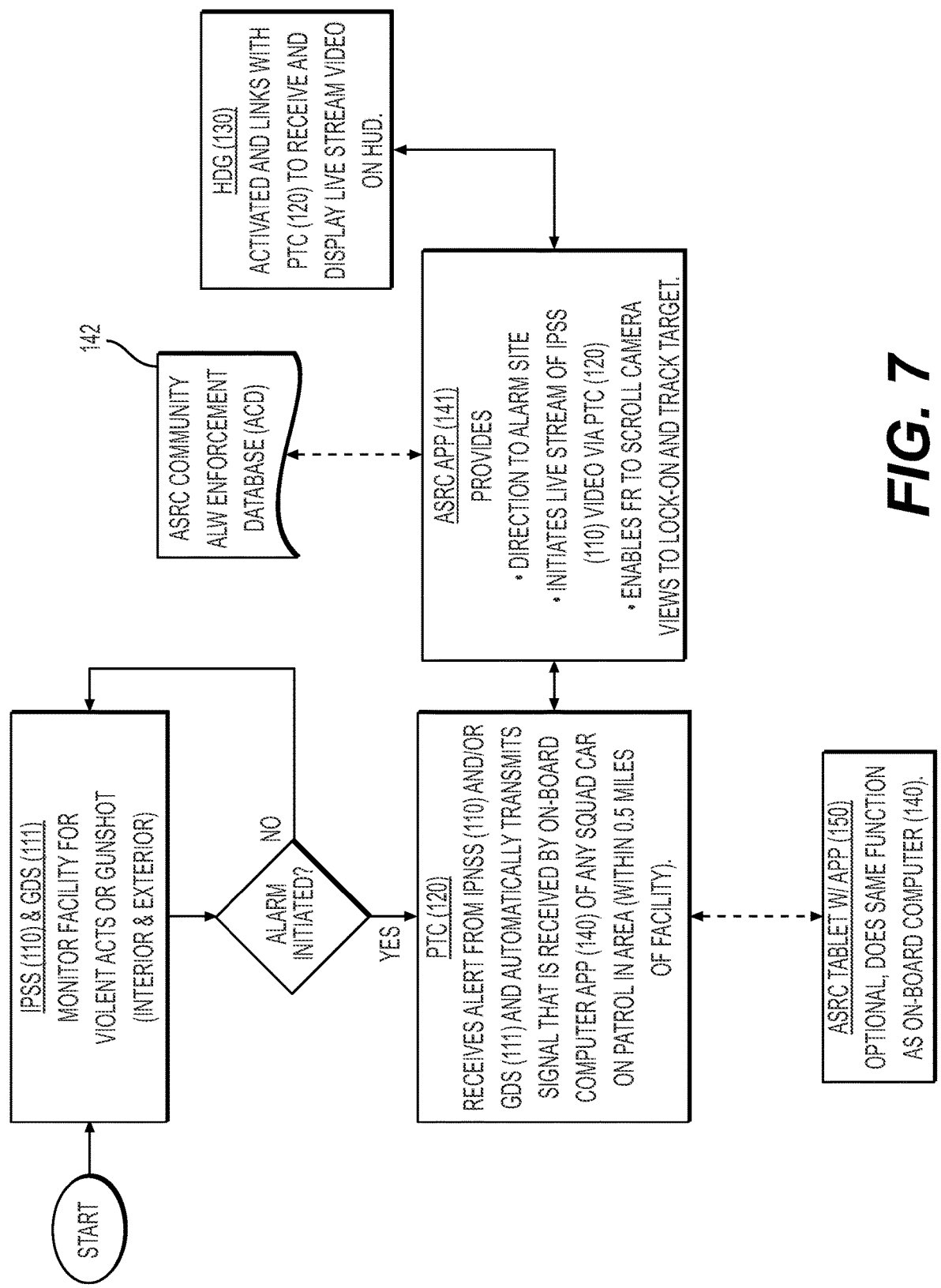
FIG. 7 shows a diagram that illustrates the ASRC operational functional process flow.

There is shown in FIG. 4A, FIG. 4B, FIG. 4C, and FIG. 4D, are pictorial illustrations of the essential ASRC system displays that include an embodiment of an emergency distress notifications resulting from the system sensor detection process, the response development process using the ASRC App FIG. 7, 140 that included an embodiment of a control panel used to enter system parameter inputs for creating scene video and data optimization, on-scene intelligence gathering process enabling the remote real-time identification, designation, and tracking of targets of interest, and the application of ASRC integrated technologies that enabled real-time visibility and situational awareness during tactical maneuvers to quickly neutralize the threat situation.

As shown in FIG. 5 and FIG. 6 provides pictorial illustrations of embodiments variation of FIG. 1 HDG 131 and 130 personalized ASRC headgear with one embodiment as a two-piece configuration FIG. 5, 530 with microphone set integrated (not illustrated). Another embodiment with the HUD capability fully integrated into the ballistic helmet FIG. 6, 630 with microphone set integrated (not illustrated).

There is shown in FIG. 7 a pictorial of a system functional process flow diagram that illustrates the overall top level system process sequence and interfacing characterized in FIGS. 1, 100, and 145. The process sequence begins at IPSS 110 and GDC 111 performing both interior and exterior facility security monitoring to detect violent acts or gunshots with a decision loop to determine if when and if an alarm process is initiated. In the event of an alarm the PTC 120 receives alert from IPSS 110 or GDC 111 and automatically transmits signals that is received by on-board computer App 140, AST 150, and any squad-car FIG. 1, 145 on patrol in the area within 0.5 miles of the facility. Simultaneously the optional AST 150 with App 140 performs the same function as the on-board computer App 140. Additionally, App 140 provides directions to the alarm sites for LEO first responders, initiates live stream of IPSS 110 video and data via PTC 120, and enables LEO's to scroll camera views to lock and track targets. There are two-way communications interface between PTC 120 and IPSS 110, PTC 120 and GDC 111, 120 and App 140, and 120 and AST 150. There are also two-way communications between App 140 and HDG 130, and App 140 and ACD 142. The communications between App 140 and ACD 142 involves ensuring that all new PTC 120 installations within a law enforcement jurisdiction is documented in the ACD and updates are pushed to all App 140 within that law enforcement jurisdiction.

What I claim as my invention is:

1. A system for Active Shooter Response and Community Law Enforcement (ASRC) to enable remote visibility into a venue and maintaining scene situational awareness for a first-to-scene (FTS) responder safety upon scene entry and duration of enforcement, the system comprising:

a venue specific internet protocol surveillance camera network (IPSN) with gunshot detection configured in a grid network schema to provide full venue coverage to include exterior facility grounds and parking lots for capture and broadcast of venue video data over a processor/transmitter/controller (PTC) enabled, encrypted, ASRC local area network (LAN) to a squad car onboard computer (SOC), an ASRC configured tablet personal computer (AST), and a user worn headgear (HDG), each having an ASRC application program (App) installed thereon, wherein the IPSN comprises:

a venue specific internet protocol surveillance camera and sensors system (IPSS) configured in a wired and/or wireless grid network of cameras and sensors that at a minimum requires Open Network Video Interface Forum (ONVIF) compatibility to enable ASRC functionality;

a venue specific gunshot detector capability (GDC) network that can be standalone sensors or integrated into the grid network cameras; and a venue specific broadcast intercom loudspeaker system (1MC) system for manual activation of threat alerts and broadcasting FTS instructions to the venue;

a venue specific processor/transmitter/controller (PTC) that provides ASRC interface and control functionality of the venue's IPSS, 1MC, GDC, and enables external and internal connectivity with ASRC equipped law enforcement assets, wherein the PTC comprises:

a processor module that performs system data processing and computing functions associated with venue IPSS, 1MC, and GDC functionality;

a transceiver module with dual radio wireless access and router functionality for establishing communications over the ASRC LAN;

a controller module that performs management functions associated with accessing and processing the venue's surveillance system network camera and sensors communications and data;

a global positioning system (GPS) receiver module that provides navigation information for the associated PTC and whenever an emergency distress alert/alarm is initiated the ASRC App will display directions to the PTC; and a PTC antenna set configured for external and internal transmission of IPSN data to establish the ASRC transmission network between the PTC, SOC, HDG, and AST, wherein a unique identifier is associated with each PTC and, upon installation in a venue, the unique identifier is documented in an associated ASRC Community Law Enforcement Database (ACD) for registration in a law enforcement area of jurisdiction;

user worn headgear (HDG) comprising a ballistic helmet and heads up display (HUD) glasses, wherein the heads up display glasses comprise:

a see-through heads-up-display (HUD) lens;

a power button to enable and disable the HDG; and a HDG transmitter, receiver, and antennas to receive live stream video data over the PTC enabled, encrypted ASRC network from the venue ISPN for display on the HUD see-through display lens; and a microphone headset (MIC) integrated into the ballistic helmet that enables communications over the ASRC LAN for the FTS to broadcast scene instructions to one or more threat suspects via the 1MC.

2. A method for an Active Shooter Response and Community Law Enforcement System (ASRC) where a first-to-scene (FTS) responder on patrol in a squad car equipped with the ASRC prepares to secure a scene, the method comprising:

activating an ASRC application program (App) at a squad car onboard computer (SOC), ASRC configured tablet personal computer (AST), and user worn headgear (HDG) comprising a ballistic helmet and heads up display (HUD) glasses upon receiving user input;

activating a global positioning system (GPS) receiver on the activated SOC, AST, and HDG upon receiving user input;

activating a microphone headset (MIC) integrated into the ballistic helmet upon receiving user input;

receiving, by the activated SOC, AST, and/or HDG, an alert from a processor/transmitter/controller (PTC) of a venue specific internet protocol surveillance camera and sensors system (IPSS), a venue specific gunshot detector capability (GDC) network, and/or a manually initiated venue specific broadcast intercom loudspeaker system (1MC) panel indicating potential shots fired, a violent threat, or a hostage situation in a public venue;

outputting an emergency notification on the activated SOC, AST, and/or HDG, wherein the notification comprises flashing a screen and beeping a sound followed by displaying a direction to the transmitting PTC upon acknowledgement of the emergency notification, and wherein:

if the alert is received from the GDC, displaying a simulated floor plan map of a floor where a detecting gunshot detector sensor is located and highlighting the sensor position on the floor plan map; and if the alert is received from the 1MC, displaying a ground level floor of the public venue;

locating a suspect/target by receiving user input to scroll through coverage of the IPSS and zoom as necessary;

initiating suspect/target lock/track by receiving user input indicating the suspect/target in order to track the target's movements;

displaying the relative position of the suspect/target so to maintain situational awareness while tracking down the suspect/target, engaging the suspect/target, and mitigating a threat;

transmitting, by the HDG, instructions for the suspect/target spoken by the FTS into the MIC; and outputting, by the 1MC, the instructions to the suspect/target received via the MIC and HDG.

* * * * *